Oct. 14, 1958 H. I. OVERSTREET 2,856,017
SINGLE WHEEL SELF-PROPELLED CARRIER
Filed Oct. 5, 1955 3 Sheets-Sheet 1
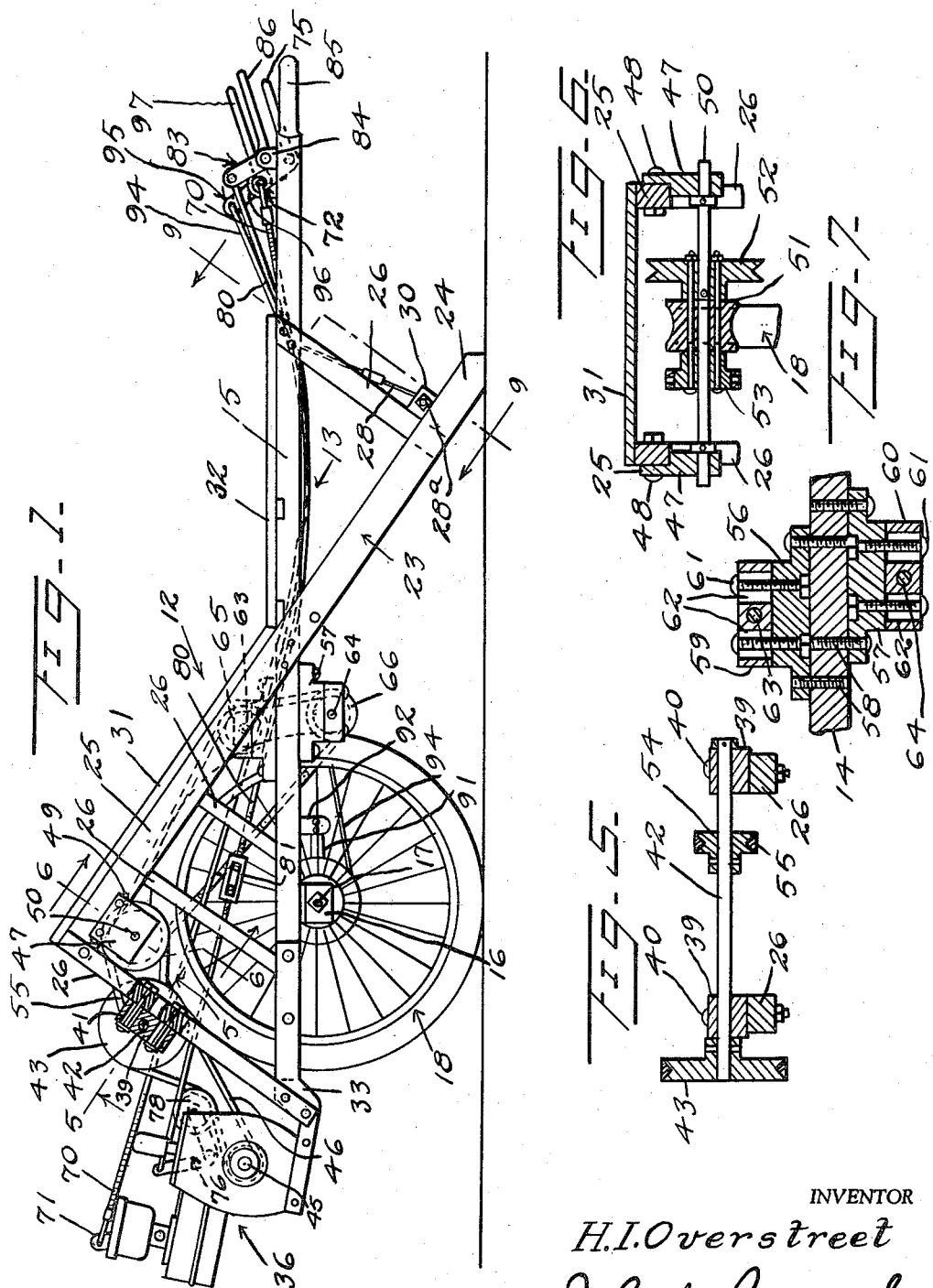
INVENTOR
H.I.Overstreet
BY John N. Randolph
ATTORNEY

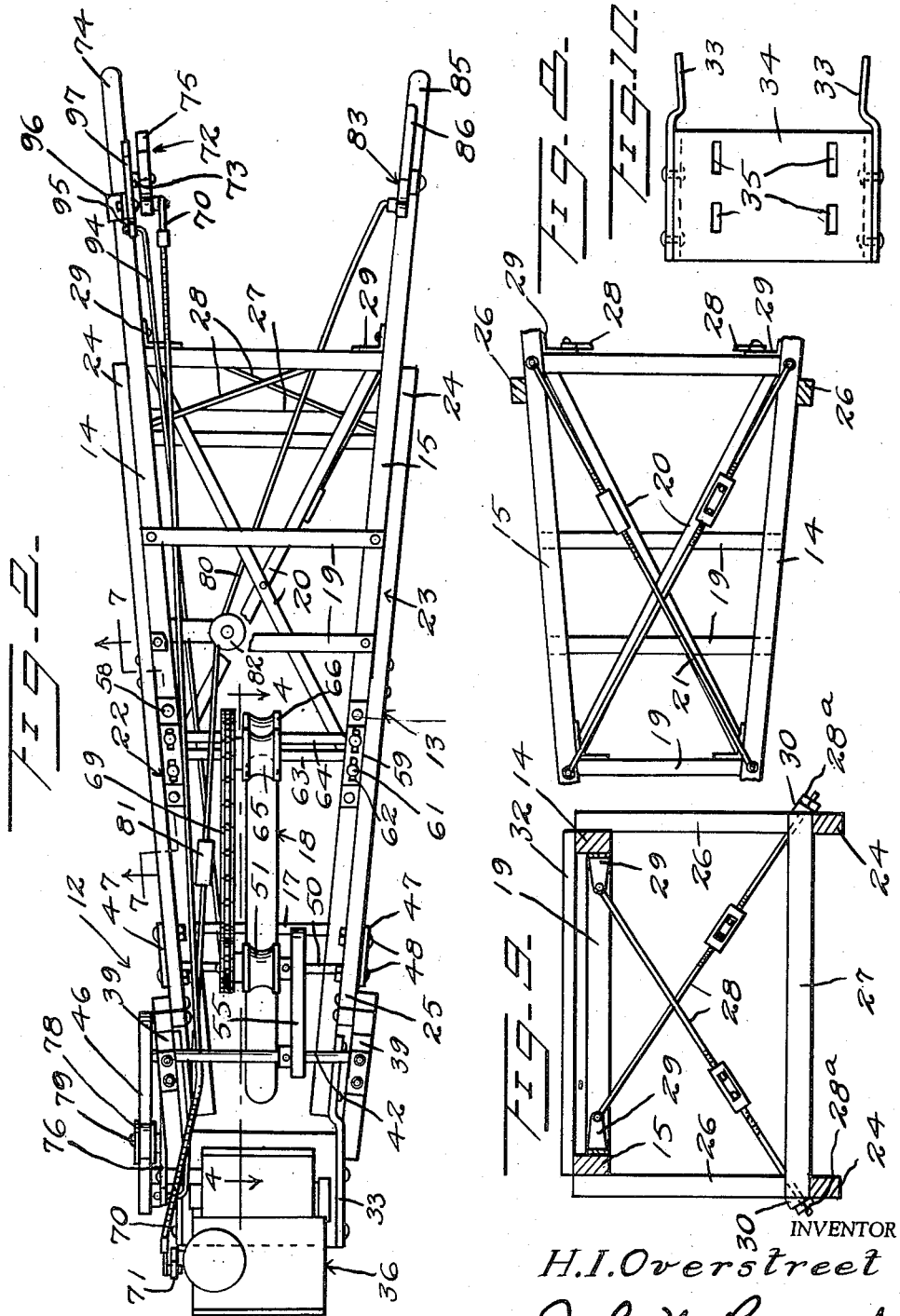

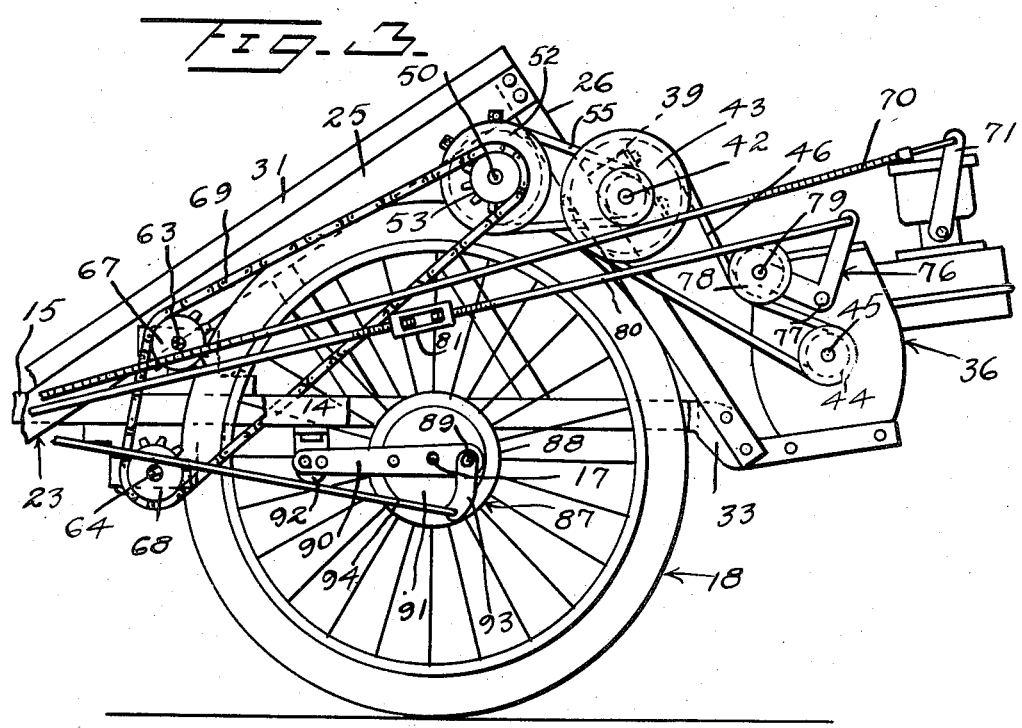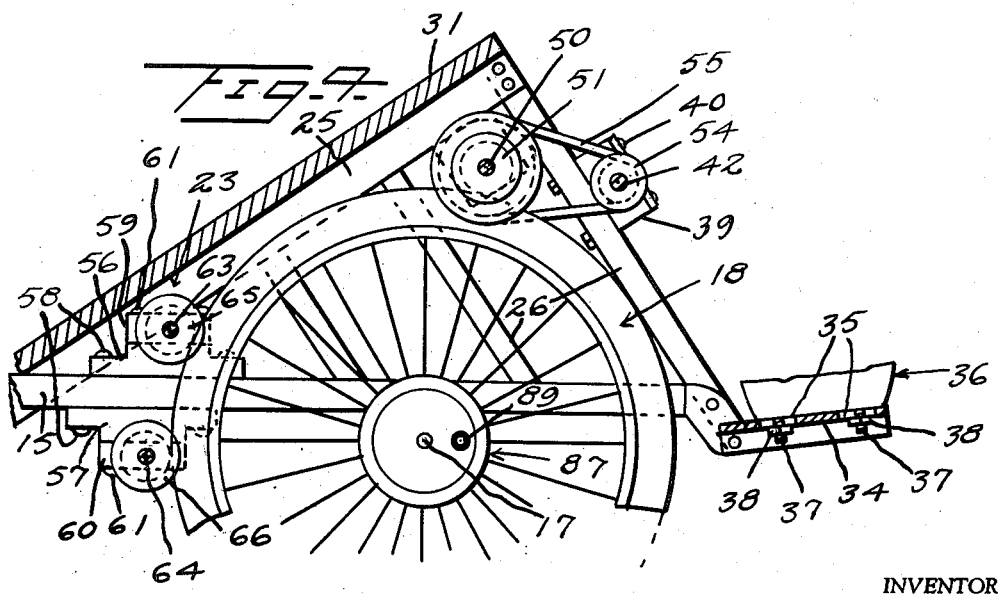

United States Patent Office 2,856,017
Patented Oct. 14, 1958

2,856,017
SINGLE WHEEL SELF-PROPELLED CARRIER
Harry I. Overstreet, Quincy, Calif.
Application October 5, 1955, Serial No. 538,686
9 Claims. (Cl. 180—19)

This invention relates to a novel self-propelled single wheel carrier which may be readily utilized for carrying loads such as luggage, or hunting, fishing and camping equipment into substantially inaccessible localities, over narrow trails or paths which cannot be traveled by conventional vehicles.

More particularly, it is an aim of the present invention to provide a carrier which will readily travel over rough and steep trails or paths at a normal walking speed of from two to three miles an hour, and which may be readily steered and controlled by an operator walking behind and manually supporting the rear end of the carrier, in substantially the same manner that a wheelbarrow is supported and guided.

A further object of the invention is to provide a single wheel carrier which is so constructed that a load borne thereby will be sustained in a substantially balanced manner relative to the ground engaging wheel of the carrier, in order that a very small part only of the weight of the load will be borne by the operator.

A further object of the invention is to provide a single wheel power-driven carrier having novel means controlling the operation thereof to effect a speeding up, a slowing down or stopping of the carrier at the will of the operator.

Another object of the invention is to provide a carrier including a load supporting platform affording an elevated supporting surface usable as a table when the carrier is not in operation.

A further object of the invention is to provide a carrier of the aforedescribed character the prime mover of which may be readily removed to enable the carrier and prime mover thereof to be conveniently transported on a conventional vehicle.

Various other objects and advantages of the invention will hereinafter become more fully apparent from the following description of the drawings, illustrating a presently preferred embodiment thereof, and wherein:

Figure 1 is a side elevational view, partly in section, of the carrier;

Figure 2 is a top plan view thereof with the platform omitted to illustrate details;

Figure 3 is an enlarged fragmentary side elevational view of the forward end of the carrier and with a part of the frame broken away to illustrate details, looking toward the opposite side thereof from the side as seen in Figure 1;

Figure 4 is an enlarged fragmentary longitudinal section view, partly in elevation, taken substantially along a plane as indicated by the line 4—4 of Figure 2;

Figure 5 is an enlarged fragmentary detail sectional view, taken substantially along a plane as indicated by the line 5—5 of Figure 1;

Figure 6 is an enlarged fragmentary detail sectional view, taken substantially along a plane as indicated by the line 6—6 of Figure 1;

Figure 7 is a fragmentary longitudinal sectional view, taken substantially along a plane as indicated by the line 7—7 of Figure 2, and on an enlarged scale;

Figure 8 is a fragmentary bottom plan view, partly in section, of a portion of the frame;

Figure 9 is an enlarged fragmentary detail cross sectional view, taken substantially along a plane as indicated by the line 9—9 of Figure 1, and Figure 10 is a fragmentary plan view of the motor supporting bracket.

Referring more specifically to the drawings, the one wheel self-propelled carrier in its entirety and comprising the invention is designated generally 12 and includes a frame, designated generally 13, which may be formed of any suitable material such as metal or wood.

The frame 13 includes longitudinally extending forwardly converging beam members 14 and 15, the forward portions of which constitute fork arms and are provided with transversely aligned hangers 16. The hangers 16 are spaced from the forward ends of the members 14 and 15 for supporting the ends of an axle 17 which is secured to said hangers. A conventional wheel 18 of the type employed with bicycles is journaled on the axle 17 between and substantially equally spaced from the beam members 14 and 15, and is maintained in a conventional manner, as is well known in the bicycle art, in a centered position between the members 14 and 15, and as illustrated in Figure 2. The wheel 18 is equipped with a pneumatic tire and is of relatively large diameter as compared to the over-all size of the carrier 12. The beam members 14 and 15, between the wheel 18 and their rear ends, are braced relatively to one another by a plurality of cross braces 19 and by diagonal braces 20. As seen in Figure 8, the beam members 14 and 15 are also braced and reinforced relative to one another by tie rods equipped with turnbuckles, as seen at 21.

The frame also includes inclined side members 22 and 23 which are secured intermediate of their ends to intermediate portions of the beams 14 and 15, respectively, rearwardly of the wheel 18. Said side members 22 and 23 have downwardly and rearwardly extending lower portions which are disposed beneath rear portions of the beams 14 and 15 and which are spaced substantially from the wheel 18 to provide supporting legs 24, which are adapted to cooperate with the wheel 18 to provide a three point support for the carrier 12, as illustrated in Figure 1, and which will support the carrier with the beams 14 and 15 thereof in substantially a horizontal plane. Said side members 22 and 23 include upper portions 25 which extend upwardly at an incline from the beams 14 and 15 to provide platform supporting members, as will hereinafter be described. Said upper portions 25 straddle and are disposed above adjacent portions of the wheel 18, and preferably terminate forwardly of the vertical center of said wheel. The end portions 24 and 25 of the side members 23 are connected to the beams 14 and 15, respectively, by diagonal braces 26. The legs 24 are connected by a cross cleat 27 which is disposed immediately beyond or below the rear diagonal braces 26 of said legs as best seen in Figures 1 and 9. Tie rods 28 equipped with turnbuckles brace the legs 24 relative to the beams 14 and 15 and are disposed in crossed relation, as illustrated in Figure 9. The upper ends of said tie rods 28 are secured to angle braces or brackets 29 which are fastened to the beams 14 and 15 and to the rearmost cross brace 19. As seen in Figure 9, the tie rods 28 have threaded lower ends which extend downwardly and outwardly through the ends of the cleat 27 and through wedge shaped blocks 30. Nuts 28a engage said lower ends of the tie rods 28 and abut against outer sides of the blocks 30.

A forward platform portion 31 is supported on and suitably secured to the upper edges of the upper side member portions 25. A rear platform portion 32 is secured to and supported on the upper edges of the beams 14 and 15 and has a forward end abutting the lower end of the platform portion 31 and a rear end terminating substantially in advance of the rear end portions of the beams 14 and 15, as seen in Figure 1.

A pair of bracket arms 33 have rear ends secured to the forward end portions of the beams 14 and 15 and extend forwardly therefrom. A supporting plate 34, as best seen in Figures 4 and 10, is secured to and supported between the forward ends of the arms 33, which may be downwardly offset relative to the rear ends of said arms, as seen in Figures 1 and 3. The plate 34 is disposed forwardly of the wheel 18 and is provided with spaced elongated slots or openings 35 which extend longitudinally of the carrier 12.

A prime mover, such as a small gasoline engine, designated generally 36, is demountably supported on the plate 34 which, in combination with the arms 33 constitutes a mounting bracket for said engine. As seen in Figure 4, the base of the engine 36 has depending threaded studs or bolts 37 which extend loosely through the slots 35. Nuts 38 engage the studs 37 and are tightened against the underside of the plate 34 for securing the engine 36 thereon. It will be apparent that the engine 36 may be adjustably clamped by the nuts 38 to the plate 34 in different forward and rearward adjusted positions relative to the forward end of the frame 13.

A pair of aligned bearing members 39 are secured by nut and bolt fastenings 40 to the forwardmost pair of braces 26. As seen in Figure 1, said bearings 39 have slots 41 for loosely receiving the bolts of the fastenings 40 and by means of which the bearing members may be adjusted longitudinally of the forward braces 26. A shaft 42 is journaled in the bearings 39 and has a belt pulley 43 fixed to one end thereof and disposed outwardly with respect to one of the bearings 39. A smaller belt pulley 44 is fixed to the drive shaft 45 of the engine 36 and which is disposed crosswise of the carrier 12. An endless V-belt 46 is trained over the belt pulleys 43 and 44 for driving the countershaft 42 from the drive shaft 45.

As best seen in Figure 6, a pair of bearing members 47 are secured to the upper parts of the side member portions 25 by nut and bolt fastenings 48 which engage longitudinally extending slots 49 of the parts 25, by means of which the bearings 47 may be adjusted longitudinally of said portions 25. The bearing members 47 depend from the bottom edges of the members 25 to provide journals for the ends of a shaft 50. A friction wheel 51 having a groove periphery is fixed to the intermediate portion of the shaft 50 and is disposed to frictionally engage the tire tread adjacent the topmost part of the wheel 18. A belt pulley 52 is fixed to the shaft 50 on one side of the wheel 51 and a sprocket wheel 53 is mounted on the shaft 50 on the other side of the friction wheel 51 to rotate with said shaft and with the friction wheel. A belt pulley 54, which is smaller than the belt pulley 52, is secured to the shaft 42, between the bearings 39, as seen in Figure 5. An endless V-belt 55 is trained over the belt pulleys 52 and 54 for driving the shaft 50 from the shaft 42.

Upper and lower filler blocks 56 and 57, respectively, are secured by fastenings 58 to the top and bottom edges, respectively, of the beams 14 and 15, forwardly of and adjacent the side members 22 and 23, as seen in Figures 1 to 4 and 7. Upper bearings 59 are mounted on the filler blocks 56 and lower bearings 60 are mounted beneath the filler blocks 57 each by nut and bolt fastenings 61, as best seen in Figure 7. The bearings 59 and 60 have longitudinally elongated openings 62 in which the bolts of the fastenings 61 are loosely disposed for adjusting the bearings 59 and 60 longitudinally of the beams 14 and 15 and toward and away from the wheel 18. A shaft 63 is supported by and journaled in the upper bearings 59, and a shaft 64 is journaled in the lower bearings 60. Peripherally grooved friction wheels 65 and 66, corresponding to the wheel 51, are fixed to the shafts 63 and 64, respectively, and have frictional engagement with the tread of the tire of the wheel 18. Sprocket wheels 67 and 68 are fixed to the shafts 63 and 64, respectively, and are disposed in substantially the same vertical plane as the sprocket wheel 53. As best seen in Figure 3, an endless chain 69 is trained over the sprocket wheels 53, 67 and 68 for driving the shafts 63 and 64 from and in the same direction as the shaft 50.

A conventional flexible shaft 70, comprising a wire contained within a flexible tubular casing which terminates at points spaced from the ends of the wire, has one end thereof pivotally connected to the throttle valve lever 71 of the engine 36, as seen in Figure 3, and has its opposite rear end pivotally connected to one arm of a bell crank 72, as best seen in Figure 1. The bell crank 72 is pivotally mounted at its apex on a bracket element 73 which is secured to the beam 14, near the rear end thereof, which constitutes the right handgrip 74 of the carrier 12. The other longer lever arm 75 of the bell crank 72 extends upwardly and rearwardly from the bracket 73, adjacent the handgrip 74 and is adapted to be engaged and actuated by the thumb of the right hand which grips the handgrip 74. The flexible shaft 70 extends longitudinally of the frame beneath the platform 31, 32, as illustrated in Figures 1 and 3.

As best illustrated in Figure 3, a bell crank 76 is pivotally mounted at 77 at its apex on a side of the casing of the engine 36 and has a grooved roller or pulley 78 journaled as seen at 79 at one end thereof and disposed to engage one flight of the belt 46. A rod 80 has one end pivotally connected to the other arm of the bell crank 76 and extends rearwardly therefrom beneath the platform 31, 32 and is preferably equipped with a turnbuckle 81, as seen in Figure 3. The rod 80 and also the shaft 70 extend between the wheel 18 and the side member 22. Said rod 80 possesses a limited amount of flexibility and preferably engages around a part of a pulley 82 which is journaled on the frame 13 rearwardly of the wheel 18, as seen in Figure 2. The rod 80 extends from the pulley 82 at an angle toward the rear end of the beam 15 and has its opposite end pivotally connected to an upwardly and forwardly extending arm of a bell crank 83 which is pivotally mounted at its apex on a bracket 84. The bracket 84 is mounted on the upper edge of the beam 15 near the rear end portion thereof which forms a handgrip 85 for the left hand. The other longer arm of the bell crank 83, designated 86, is disposed directly over the handle 85 to be gripped therewith by the left hand for exerting a rearward pull on the rod 80 for rotating the bell crank 76 in a direction to swing the pulley 78 toward the belt 46 for tensioning the belt and so that the countershaft 42 will be driven by the motor shaft 45.

The wheel 18 is provided with a conventional brake 87 which is located on the right hand side thereof, as best seen in Figure 3. The brake 87 includes a drum 88 which rotates with the wheel 18. Conventional brake shoes, not shown, for engagement with the drum 88 are contained within the housing of the brake 87 and are adapted to be expanded by a cam, not shown, in a conventional manner, which cam is also contained within the brake housing and fixed to a shaft 89 which extends outwardly from the brake 87 in a direction away from the wheel 18 and which is journaled in a bar 90 which is fixed to a stationary front plate 91 of the brake housing and to a bracket 92 which is secured to the beam 14. A lever 93 is fixed to the shaft 89 and is disposed outwardly of the bar 90 and plate 91 and extends downwardly from said shaft. One end of a rod 94 is pivotally connected to the lower portion of the lever 93, and said rod 94 extends rearwardly from the lever 93 through the frame 13 below the platform 31, 32. The other end of the rod 94 is pivotally connected to the upwardly and forwardly extending arm of a bell crank 95 which is pivotally mounted at its apex on a bracket 96. The bracket 96 is mounted on the beam 14 forwardly of and adjacent the right handgrip 74 and supports the bell crank 95 in laterally offset relation to the bell crank 72. The other longer arm 97 of the bell crank 95 extends upwardly and rearwardly and is disposed adjacent the handle 74 to be selectively engaged by the thumb of the right hand.

From the foregoing it will be readily apparent that the three friction wheels 51, 65 and 66 will be maintained at all times in contact with the tread of the tire of the wheel 18. By adjustment of the bearings of the shafts 50, 63 and 64, said friction wheels may be adjusted longitudinally of the frame 13 to compensate for wear on the tire and so as to maintain the friction wheels in proper frictional contact with the tire tread. The bearings of said shafts 50, 63 and 64 as well as the bearings 39 may be of any conventional type to facilitate the adjustment thereof relative to the frame 13 and may constitute conventional self-aligning bearings. Assuming that the motor 36 is operating to turn the drive shaft 45, the rear end of the frame is elevated relative to its position of Figure 1 by the operator grasping and lifting upwardly on the handgrips 74 and 85, in the same manner that a wheelbarrow is supported for movement. By manipulation of the right thumb, the arm 75 of the bell crank 72 can be turned clockwise as seen in Figure 1 to open the throttle of the engine 36 to a desired operating speed. At the same time, the bell crank lever 86 can be gripped with the handgrip 85 by the left hand to exert a rearward pull on the rod 80 for rocking the bell crank 76 counterclockwise as seen in Figure 3 to cause the pulley 78 to engage and tension the belt 46 so that the shaft 42 will be driven by the motor shaft 45, both in a counterclockwise direction as seen in Figure 3. The shaft 50 will in a like manner be driven by the shaft 42 in the same direction by the belt and pulley drive 52, 54, 55. The shafts 63 and 64 will be driven by the shaft 50 and in the same direction by the chain and sprocket wheel drive 69, 53, 67 and 68. Thus, the three friction wheels 51, 65 and 66 will all be driven counterclockwise as seen in Figure 4 for propelling the carrier 12 from right to left as seen in Figures 1 and 2. The throttle may be manually regulated as heretofore described to cause the carrier 12 to be driven at a normal walking speed of between two and three miles an hour. Forward movement of the carrier may be readily interrupted by merely releasing pressure on the hand lever 86 either with or without throttling down the engine 36 by manipulation of the lever 75. Additionally, the carrier 12 may be positively stopped as where traveling downhill, by applying a downward pressure with the right thumb to the lever 97 to actuate the brake lever 93 for applying the brake 87.

The platform members 31 and 32 are adapted to be utilized for supporting the load to be conveyed by the carrier 12 a part of which will be substantially centered over the wheel 18 when the right hand end of the frame 13 is elevated, as previously described. Additionally, the motor 36 will function to partially counterbalance the weight of the load supported on the rear platform portion 32.

The wheel 18 is of relatively large diameter so that it can readily pass over rough terrain. The carrier 12 is relatively narrow, as seen in Figure 2, so that it can readily traverse narrow paths. The belt and pulley drive of the motor shaft 45 to the shaft 50 affords a speed reduction means so that the engine 36 will provide adequate power to propel the carrier 12 up steep slopes.

The motor 36 may be readily disconnected from the bracket plate 34 and removed from the frame 13 after disconnecting the flexible shaft 70, the rod 80 and the belt 46, so that the motor can be readily carried in a vehicle and the remainder of the carrier 12 may then be readily secured to and transported by said vehicle.

Various modifications and changes are contemplated and may obviously be resorted to, without departing from the spirit or scope of the invention as hereinafter defined by the appended claims.

I claim as my invention:

1. In a one wheel power driven carrier having an elongated frame including a pair of side beams, a supporting and driving wheel rotatably mounted between said side beams and extending thereabove, said side beams having end portions extending horizontally outwardly beyond said wheel and upstanding side frame portions on opposite sides of and projecting above said wheel, a power plant mounted on said end portions beyond said wheel and below the upper portion of the latter and driving means connecting said power plant to said wheel; said driving means including a plurality of shafts mounted upon and extending transversely of said frame, a peripherally grooved friction wheel fixed to each shaft, said friction wheels being disposed outwardly of and having driving engagement with only the upper portion of the periphery of the supporting wheel which extends from immediately beneath said side beam to beyond the uppermost portion of said supporting wheel, means connecting each of said shafts for simultaneous operation of said friction wheels, speed reduction means mounted on said side frame portions and operatively connected to said power plant and to one of said shafts.

2. The combination of claim 1 including upper and lower bearings movably mounted respectively upon the upper and lower sides of said side beams for independent longitudinal adjustment thereon, each of said upper and lower bearings having one of said shafts journaled therein and movable therewith.

3. The combination of claim 1 wherein said speed reduction means includes a countershaft, means journaling said countershaft on said side frame portions, a pair of belt and pulley means connecting said countershaft to said prime mover and to said one of said shafts respectively.

4. The combination of claim 3 including a belt tightener means operatively associated with one of said pair of belt and pulley means for selectively establishing and discontinuing a driving connection between the prime mover and said one of said shafts.

5. The combination of claim 1 wherein said speed reduction means includes a countershaft, means journaling said countershaft on said side frame portions, a pair of belt and pulley means connecting said countershaft to said prime mover and to said one of said shafts respectively, said countershaft and the shaft to which it is connected being both disposed below the top of said side frame portions and between the front and rear portions of said supporting wheel.

6. The combination of claim 5 wherein that friction wheel shaft to which the countershaft is connected lies above said supporting wheel and within said side frame portions.

7. The combination of claim 1 wherein said shaft connecting means is disposed between said side beams and between said side frame portions.

8. The combination of claim 1 wherein a pair of said shafts and their friction wheels are disposed in closely spaced relation and on opposite sides of the horizontal plane through the longitudinal axes of said side beams.

9. The combination of claim 1 wherein a pair of said shafts and their friction wheels are disposed in closely spaced relation and on opposite sides of the horizontal plane through the longitudinal axes of said side beams, and at the rear side of said supporting wheel.

References Cited in the file of this patent

UNITED STATES PATENTS

| | | |
|---|---|---|
| 290,156 | Whitney | Dec. 11, 1883 |
| 662,066 | Gates | Nov. 20, 1900 |
| 1,005,291 | Owen | Oct. 10, 1911 |
| 2,253,288 | DeLucchi | Aug. 19, 1941 |
| 2,545,735 | Howard | Mar. 20, 1951 |
| 2,638,172 | Borchin et al. | May 12, 1953 |
| 2,656,894 | Giovannoni | Oct. 27, 1953 |